(12) United States Patent
Steelman et al.

(10) Patent No.: US 8,201,859 B2
(45) Date of Patent: *Jun. 19, 2012

(54) DOOR HANDLE ASSEMBLY (75) Inventors: James L. Steelman, Rochester, MI (US); Timothy F. O'Brien, White Lake, MI (US); Larry Vigneau, Ortonville, MI (US); Jeromy D. Weible, Waterford, MI (US); Daniel V. Beckley, Byron, MI (US)

(73) Assignee: Intier Automotive Inc., Newmarket (CA)

( * ) Notice: Subject to any disclaimer, the term of this patent is extended or adjusted under 35 U.S.C. 154(b) by 1062 days.

This patent is subject to a terminal disclaimer.

(21) Appl. No.: 12/126,462

(22) Filed: May 23, 2008

(65) Prior Publication Data

US 2009/0127875 A1    May 21, 2009

Related U.S. Application Data (63) Continuation-in-part of application No. 11/189,282, filed on Jul. 26, 2005, now Pat. No. 7,377,562.

(51) Int. Cl.
E05B 3/00 (2006.01)
(52) U.S. Cl. ............... 292/336.3; 292/292; 292/349
(58) Field of Classification Search ......... 292/336.3, 292/292, 349, 352, DIG. 2, 353, 355, 1, DIG. 27, 292/348, DIG. 20, DIG. 47
See application file for complete search history.

(56) References Cited

U.S. PATENT DOCUMENTS

| | | | |
|---|---|---|---|
| 1,389,477 A | 8/1921 | Beeman | |
| 1,877,289 A | 9/1932 | Field | |
| 3,151,898 A | 10/1964 | Olander | |
| 4,041,798 A | 8/1977 | Shinozaki et al. | |
| 4,102,588 A | 7/1978 | Jeavons | |
| 5,377,450 A | 1/1995 | Varajon | |
| 6,578,446 B2* | 6/2003 | Staser et al. | 74/519 |
| 6,644,074 B2 | 11/2003 | Monig | |
| 6,988,752 B2 | 1/2006 | Belchine, III et al. | |
| 7,377,562 B2* | 5/2008 | Steelman | 292/336.3 |
| 2005/0067844 A1 | 3/2005 | Pudney | |
| 2007/0024067 A1 | 2/2007 | Steelman | |

FOREIGN PATENT DOCUMENTS

WO    WO-0011295    3/2000

OTHER PUBLICATIONS

European Search Report for Application No. EP 09 00 6749.

* cited by examiner

*Primary Examiner* — Carlos Lugo
*Assistant Examiner* — Mark Williams
(74) *Attorney, Agent, or Firm* — Honigman Miller Schwartz and Cohn LLP (57) ABSTRACT A door handle assembly for a door substrate having an aperture, said door handle assembly comprising: a bell crank capable of pivoting about an axis, the bell crank including a first arm, a second arm and a base therebetween; a door handle that operatively engages the second arm of the bell crank, wherein a free end of the second arm extends upward and outward away from the base such that the free end of the second arm sweeps around a generally conical shape as the bell crank pivots about the axis; means for securing the door handle to the bell crank including a pin and notch assembly, wherein the pin is inserted through an aperture in the door handle and engages a notch located on the second arm; and a plurality of ribs formed on one or more surfaces of the bell crank.

16 Claims, 9 Drawing Sheets

DOOR HANDLE ASSEMBLY

RELATED APPLICATION

This application is a continuation-in-part of U.S. patent application Ser. No. 11/189,282 filed on Jul. 26, 2006 (now U.S. Pat. No. 7,377,562 issued on May 27, 2008).

TECHNICAL FIELD

The present invention generally relates to door handles in a vehicle and in particular, to a door release assembly.

BACKGROUND OF THE INVENTION

The automotive industry is increasingly focusing on improvements within the interior of the vehicle. As a result, the design and esthetics of the interior space of the vehicle is becoming more increasingly important to the manufacturer and the end customer.

One particular area of interest within the interior space of the vehicle is the door assembly. The door assembly typically includes many trim components, such as, amongst others, an armrest, a door release handle, speakers, and a map pocket. These various trim components may be manufactured from several different materials, using a range of manufacturing processes. As a result, the door assembly is a conglomeration of several trim components with various aesthetic appearances and functions. Challenges arise in designing and manufacturing door assemblies to function properly and look aesthetically pleasing.

SUMMARY OF THE INVENTION

The inventors of the present invention have recognized these and other problems associated with designing components for the interior of a vehicle. To this end, the inventors have invented a door assembly comprising a door substrate having an aperture, a bell crank including a first arm having a pivot axis, a second arm, and a base therebetween, wherein the second arm extends through the aperture of the door substrate, a door handle that operatively engages the second arm of the bell crank past the aperture of the door substrate, and a back plate secured to the bell crank. A further invention is a bell crank for a door handle comprising a first arm being capable of pivoting about an axis, a second arm, and a base connecting the first arm to the second arm, wherein the first arm and the base rotate about the axis in a planar direction.

DETAILED DESCRIPTION

Referring to the Figures, a vehicle door substrate ("substrate") is generally shown at 10. The substrate 10 comprises of an inner, or "A" surface 12, visible to an occupant of the vehicle, and an outer, or "B" surface 14 that is not visible to the occupant. The substrate 10 includes, amongst other features, a door release handle assembly 16 ("handle assembly").

Handle assembly 16 comprises of a handle 18, a bell crank 20 and a back plate assembly 21. According to an embodiment of the invention, bell crank 20 is secured to back plate assembly 21, and handle 18 is secured to bell crank 20.

Figure 1:
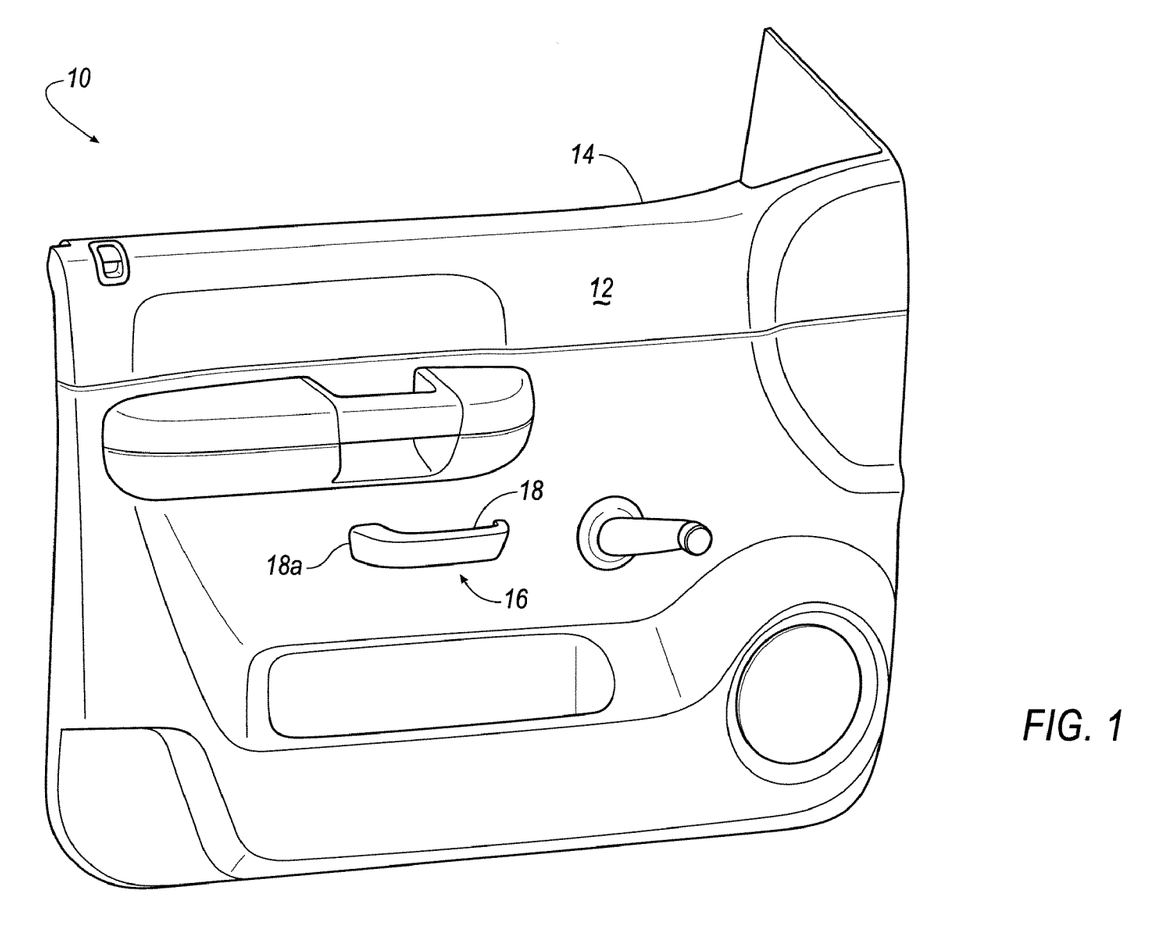
FIG. 1 is an isolated view of a vehicle door trim according to an embodiment of the invention.
Figure 2:
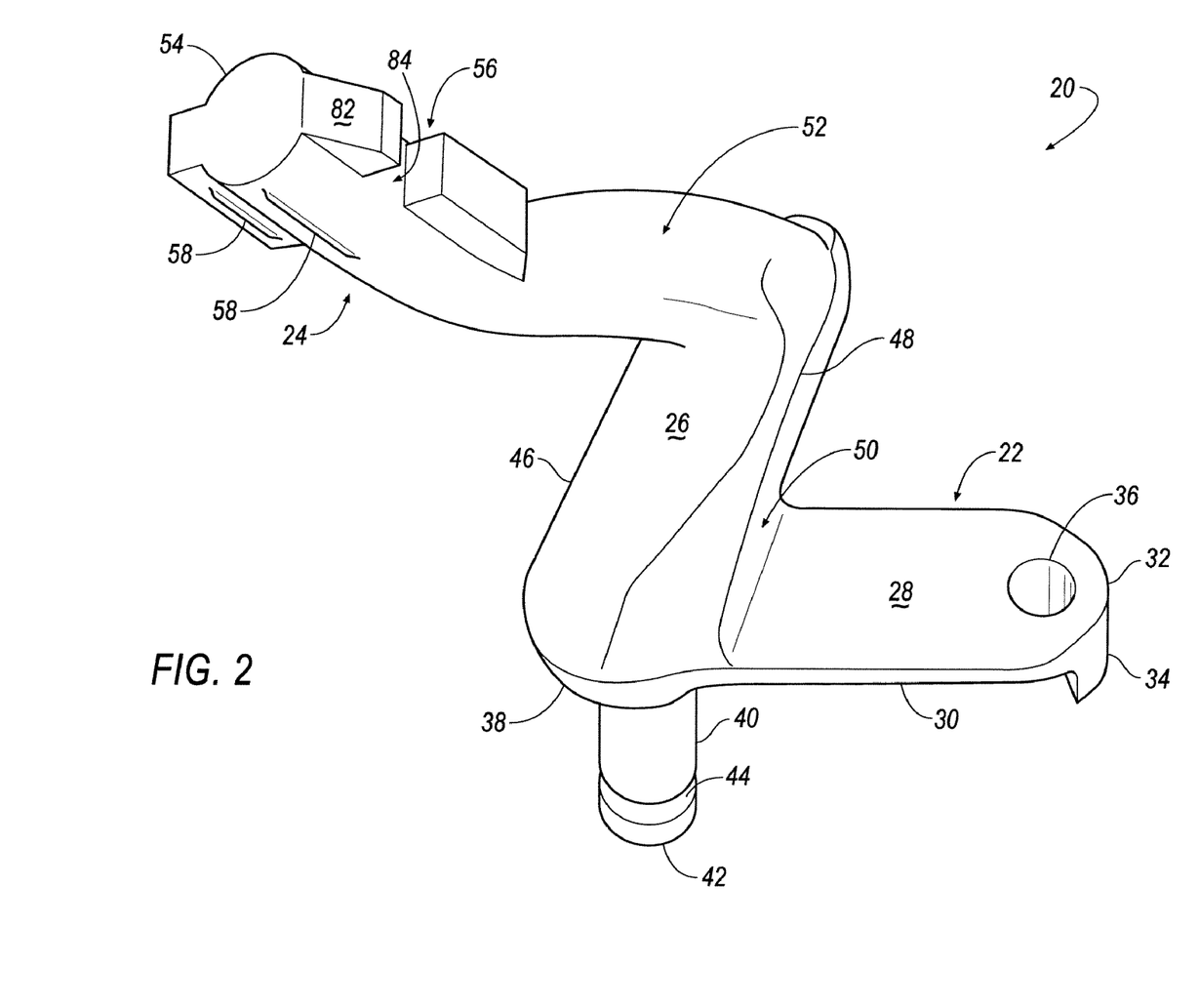
FIG. 2 is an isolated view of the bell crank according to an embodiment of the invention.

FIG. 2 illustrates bell crank 20 according to an embodiment of the invention. The bell crank 20 comprises a first arm 22, a second arm 24 and a base 26 therebetween. First arm 22 has an upper surface 28 and a lower surface 30. Second arm 24 extends upward and outward away from upper surface 28 of first arm 22 and base 26 connects first arm 22 and second arm 24 to each other. In the illustrated embodiment, bell crank 20 is manufactured from steel. However, it can be appreciated that bell crank 20 may be manufactured from any material, including, for example, plastic. Further, while bell crank 20 is illustrated as being formed as one piece, it can be appreciated that first arm 22, second arm 24 and base 26 of bell crank 20 may be manufactured as multiple pieces and assembled to form bell crank 20.

One end 32 of first arm 22 includes a means for securing a cable assembly 34 to bell crank 20. The means for securing a cable assembly 34 is generally known in the art and may include, for example, a pin and lock assembly (not shown). As illustrated, means for securing a cable assembly 34 includes a cavity 36, for engaging a pin (not shown) and a slot (not shown) for locking the pin. The means for securing a cable assembly 34 extends downward from lower surface 30 of first arm 22. An opposing end 38 of first arm 22 may include a pivot pin 40 that extends downward from lower surface 30. An open end 42 of pivot pin 40 may include a groove 44 that extends around the circumference of pivot pin 40.

Base 26 extends upwards and at an angle from upper surface 28 of first arm 22. Thus, an edge 46 of base 26 lies upon the same plane as the first arm 22 and an opposing edge 48 of base 26 is located above upper surface 28 of first arm 22, on a separate plane. A side 50 of base 26, partially outlined by opposing edge 48 of base 26, extends downward to upper surface 28 of first arm 22. As illustrated, base 26 lies at an angle from upper surface 28. As illustrated, base 26 lies at approximately a thirty-degree angle from upper surface 28 of first arm 22. However, it can be appreciated that base 26 may lie at any angle from upper surface 28 of first arm 22, or base 26 may be parallel to upper surface 28 of first arm 22.

Base 26 extends from pivot pin 40 of first arm 22 to second arm 24. Second arm 24 comprises of a neck portion 52 and a free end 54. As illustrated, neck portion 52 of second arm 24 extends from base 26 and gently curves upward and outward at approximately a forty-five-degree angle away from base 26. Free end 54 of second arm 24 extends substantially outward from neck portion 52 and includes a notch 56 and a plurality of skives 58.

Figure 3:
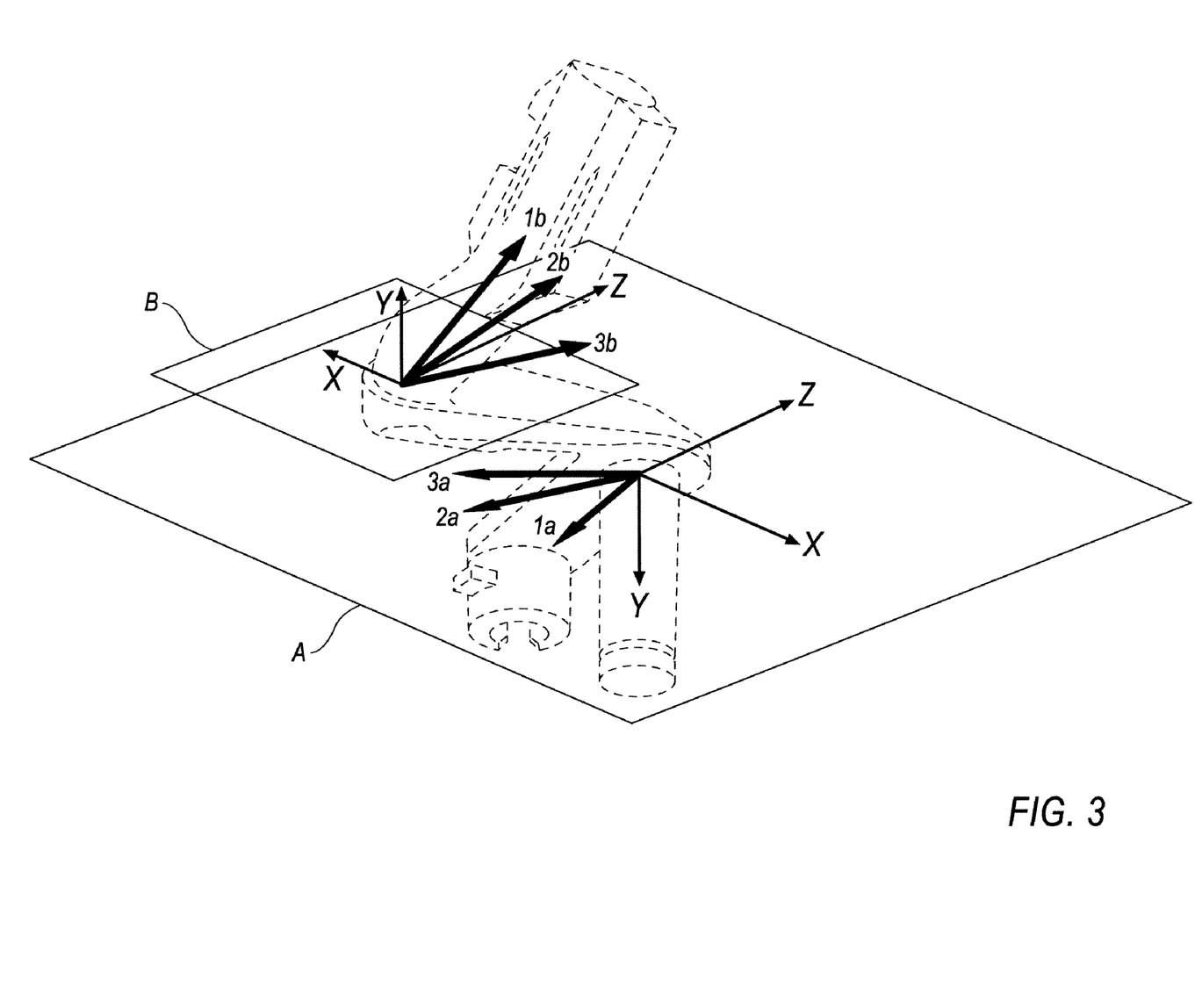
FIG. 3 is a schematic view of the movement of a bell crank according to an embodiment of the invention.

FIG. 3 illustrates the general movement of bell crank 20 according to an embodiment of the invention. As shown, first arm 22 and edge 46 of base 26 rotate about pivot pin 40 along plane A. Arrows 1a, 2a and 3a illustrate three locations along plane A in which first arm 22 and edge 46 of base 26 may rotate past. Second arm 24 connects to base 26 at a point on plane B. Second arm rotates around pivot pin 40 in a non-planar direction. Arrows 1b, 2b and 3b illustrate the general direction of second arm 24 as second arm 24 rotates around pivot pin 40.

Figure 4:
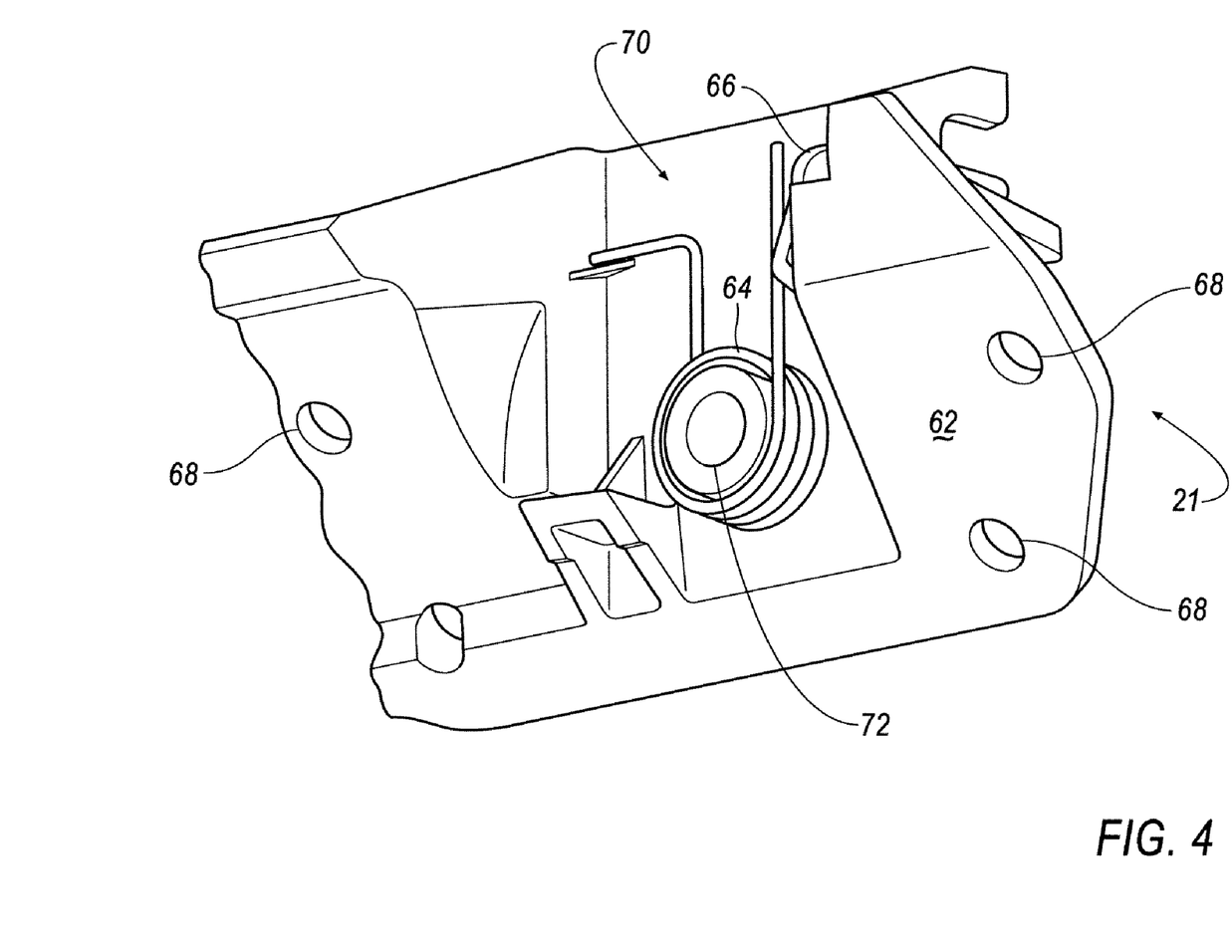
FIG. 4 is an isolated view of a back plate assembly according to an embodiment of the invention.

Referring to FIG. 4, back plate assembly 21 comprises of a back plate 62, a biasing member 64 and a stopper 66. As illustrated, biasing member 64 may be a spring, coil, or the like. Back plate 62 may include a plurality of small apertures 68 and a cavity 70. Cavity 70 further includes an aperture 72 surrounded by biasing member 64. Back plate 62 may be manufactured from any material. For example, in the illustrated embodiment, back plate 62 is manufactured from a plastic material by an injection molding process. Further, it can be appreciated that the invention may be practiced without cavity 70.

Figure 5:
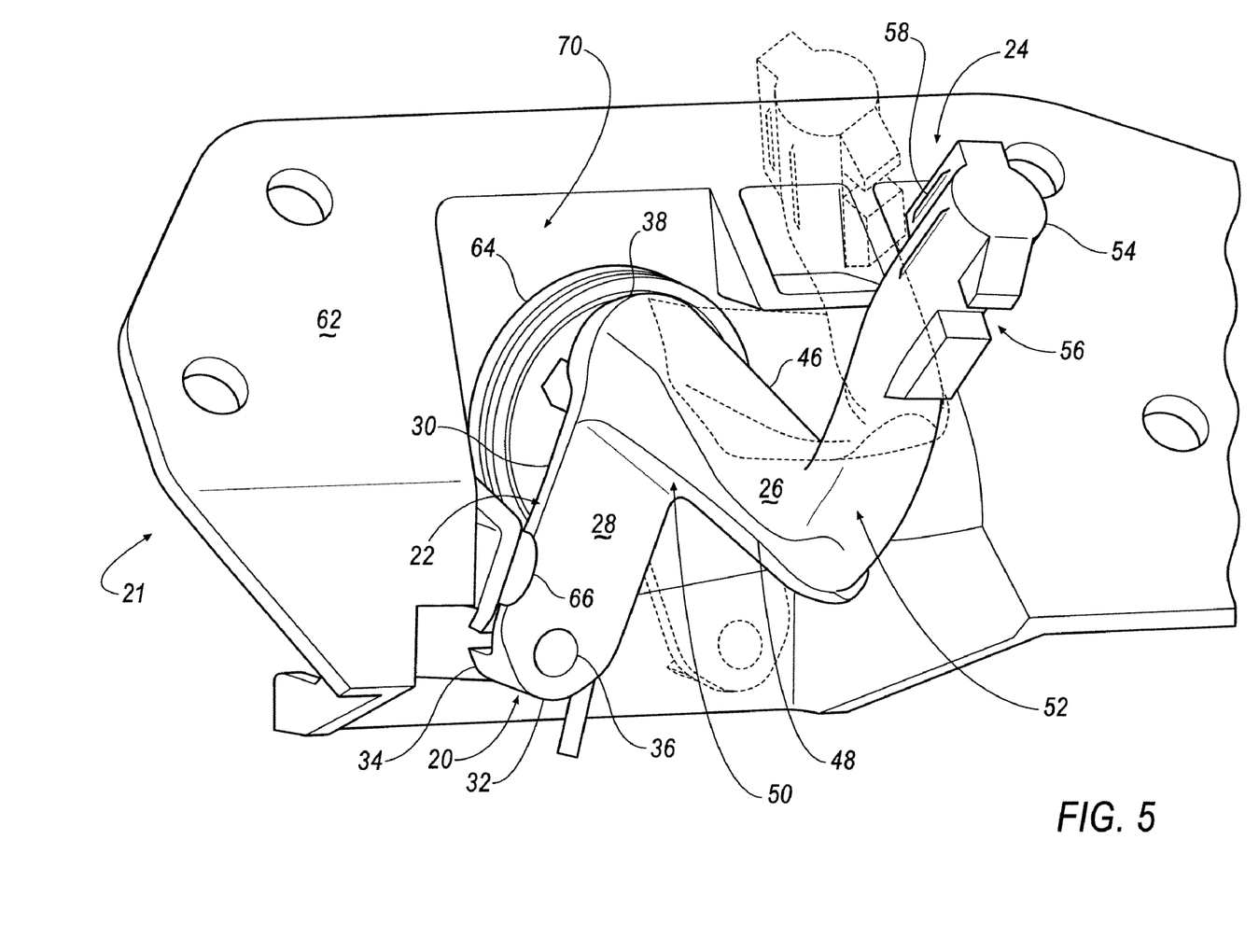
FIG. 5 is a perspective view of the bell crank attached to the back plate assembly according to an embodiment of the invention.

As illustrated in FIG. 5, bell crank 20 may be attached to back plate assembly 60 by inserting pivot pin 40 into aperture 72 of cavity 70 of back plate 62. Biasing member 64 provides a biasing force against first arm 22 of bell crank 20, maintaining bell crank 20 in a rest position, illustrated by solid lines in the Figure. A washer assembly (not shown) may engage groove 44 of pivot pin, thereby securing bell crank 20 to back plate 62. However, it can be appreciated that the invention may be practiced without groove 44 and that bell crank 20 may be secured to back plate 62 by any conventional means.

Once bell crank 20 is secured to back plate 62, back plate 62 may be attached to outer surface 14 of substrate 10. Fasteners (not shown), such as, for example, screws, nuts and bolts, or the like, may be inserted into apertures of back plate 62 to secure back plate 62 assembly to outer surface 14 of substrate 10. However, it can be appreciated that back plate 62 may be secured to outer surface 14 of substrate 10 by any conventional methods, including, for example, welding, riveting or the like, back plate 62 to outer surface 14 of substrate 10. Accordingly, the invention may be practiced with back plate 62 being manufactured without apertures 68.

Figure 6:
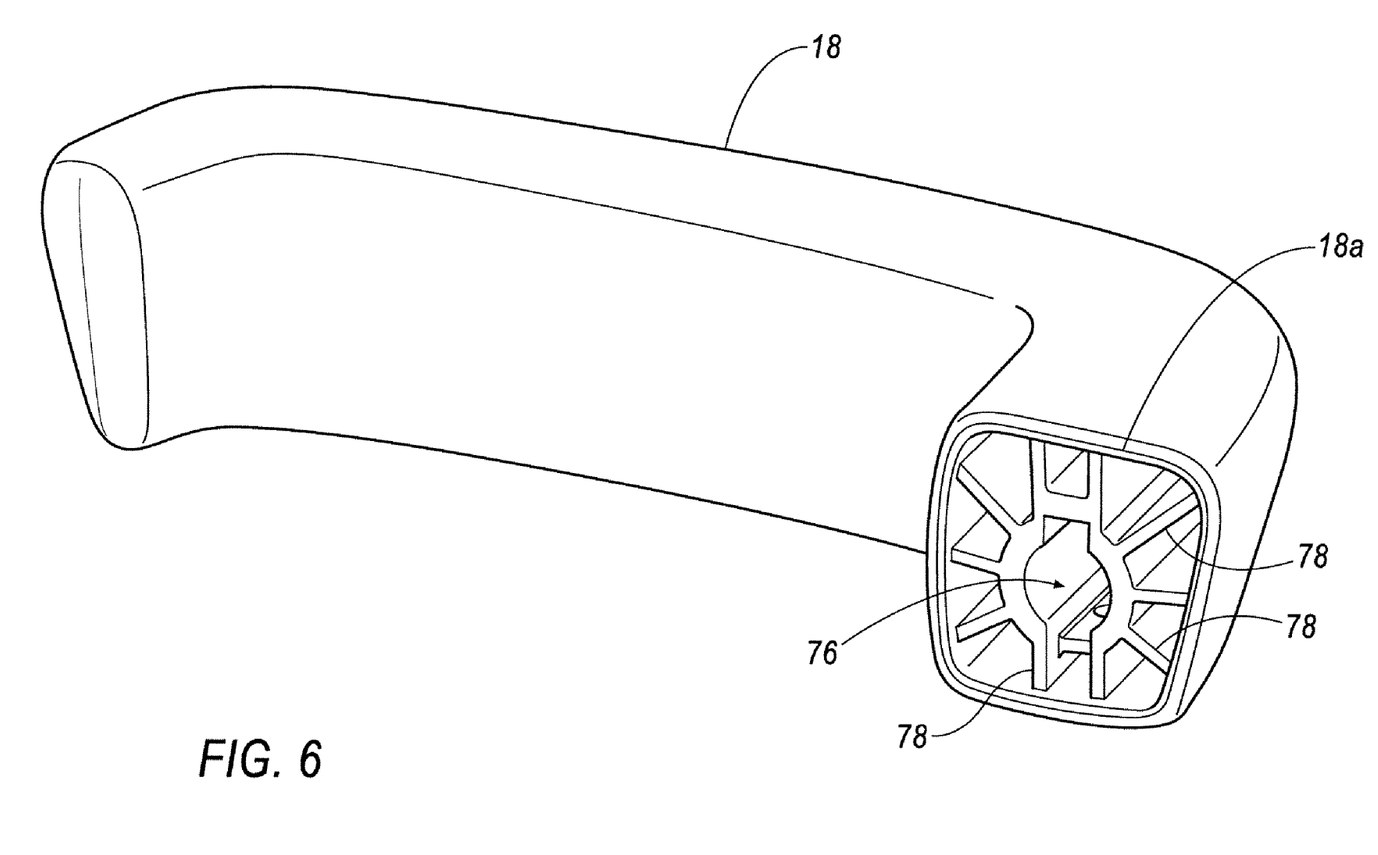
FIG. 6 is an isolated view of a door handle according to an embodiment of the invention.
Figure 7:
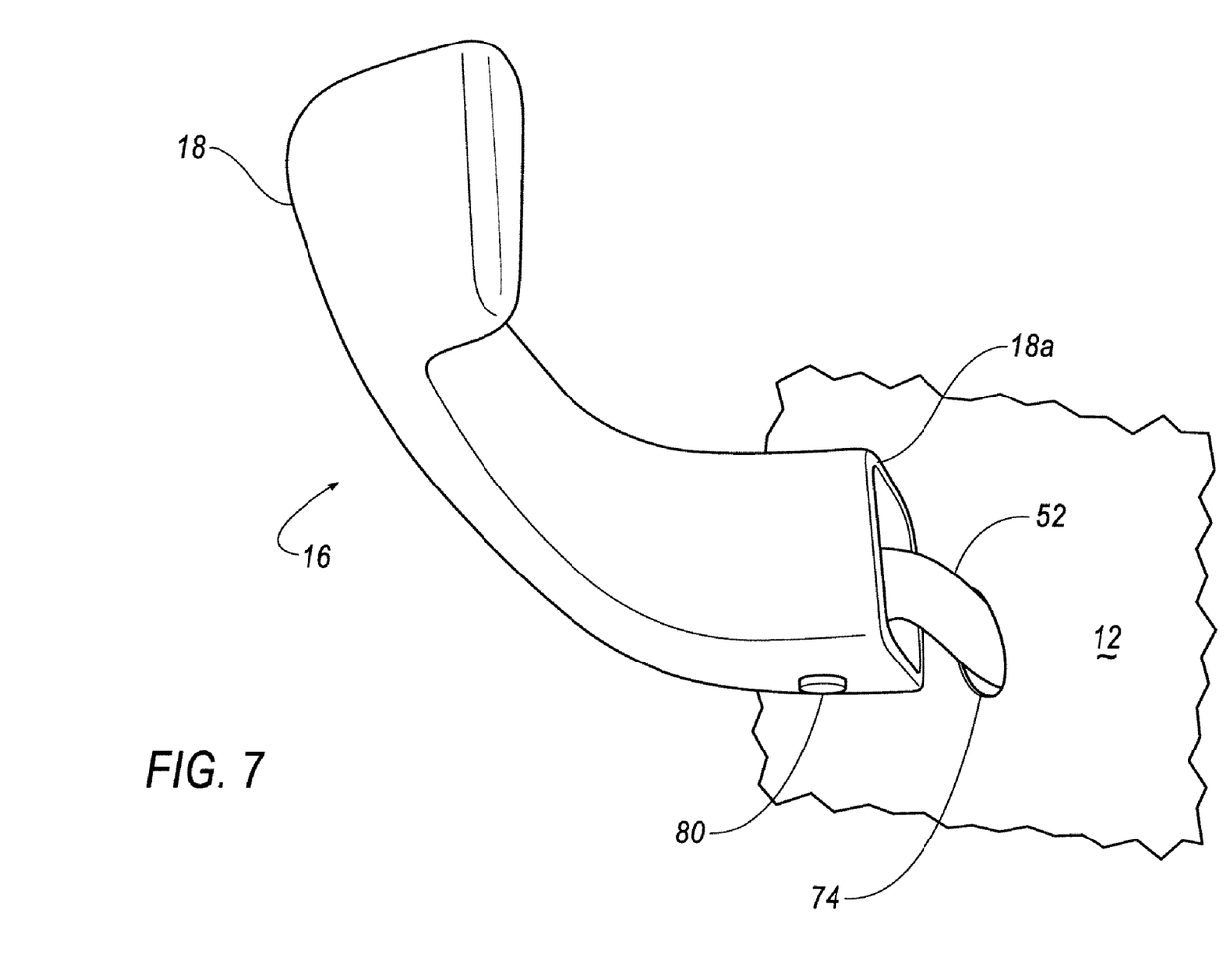
FIG. 7 is a perspective view of a partial handle assembly according to an embodiment of the invention.

Referring to FIGS. 6 and 7, when back plate 62 is attached to outer surface 14 of substrate 10, free end 54 of second arm 24 of bell crank 20 passes through an aperture 74 on substrate 10. Handle 18 may then be secured to free end 54 of second arm 24. Handle 18 may include a cavity 76 reinforced by a series of ribs 78 for securing handle 18 to free end 54 of second arm 24. As handle 18 engages free end 54 of second arm, skives 58 of free end 54 burrow into the circumferential surface of cavity 76 of handle 18. However, it can be appreciated that handle 18 may be secured to free end 54 of second arm 24 by any conventional method.

Handle 18 further includes a pin 80 that engages notch 56 of free end 54 of second arm. As handle 18 is inserted over free end 54 of second arm, pin 80 of handle 18 operatively contacts notch 56 of free end 54. Notch 56 of free end 54 includes a ramp surface 82, which exerts an upward force on pin 80 when handle 18 is inserted over free end 54 of second arm 24. Once handle 18 is generally inserted over free end 54 of second arm 24, pin 80 of handle 18 engages a cavity 84 in notch 56, resulting in handle 18 being secured to second end of bell crank 20.

Typically, a passenger (not shown) exerts a force on handle 18 to exit the interior of the vehicle. The exerted force may pull the handle 18 upward and outward, away from inner surface 12 of substrate 10. As the force is exerted on handle 18, bell crank 20 rotates around pivot pin 40 to an actuated position, illustrated by phantom lines in FIG. 4. During rotation, first arm 22 of bell crank 20 rotates along the circumference of aperture 72 in a planar direction. As a result, first arm 22 of bell crank 20 actuates the cable assembly to open a vehicle door (not shown). Similarly, second arm 24 of bell crank 20 rotates around pivot pin 40 at an angle upward and outward from first arm 22. As second arm 24 of bell crank 20 rotates around pivot pin 40, neck portion 52 of second arm 24 of bell crank 20 passes through aperture 74 of substrate 10.

Biasing member 64 exerts a biasing force against bell crank 20, resulting in a smooth transition from the rest position to the actuation position, and vice versa. Accordingly, when handle 18 is released by the passenger, biasing member 64 causes bell crank 20 to return to the rest position. Stopper 66 of back plate 62 cushions the contact between first arm 22 and back plate 62.

The overall shape of bell crank 20 transitions from a generally flat, rectangular first arm 22 to a generally tubular second arm. However, it can be appreciated that bell crank 20 is not limited by the above described shapes and angles and may include any particular shape and angle, so long as second arm 24 extends outward at approximately a forty-five-degree angle when bell crank 20 rotates about pivot pin.

Figure 8A:
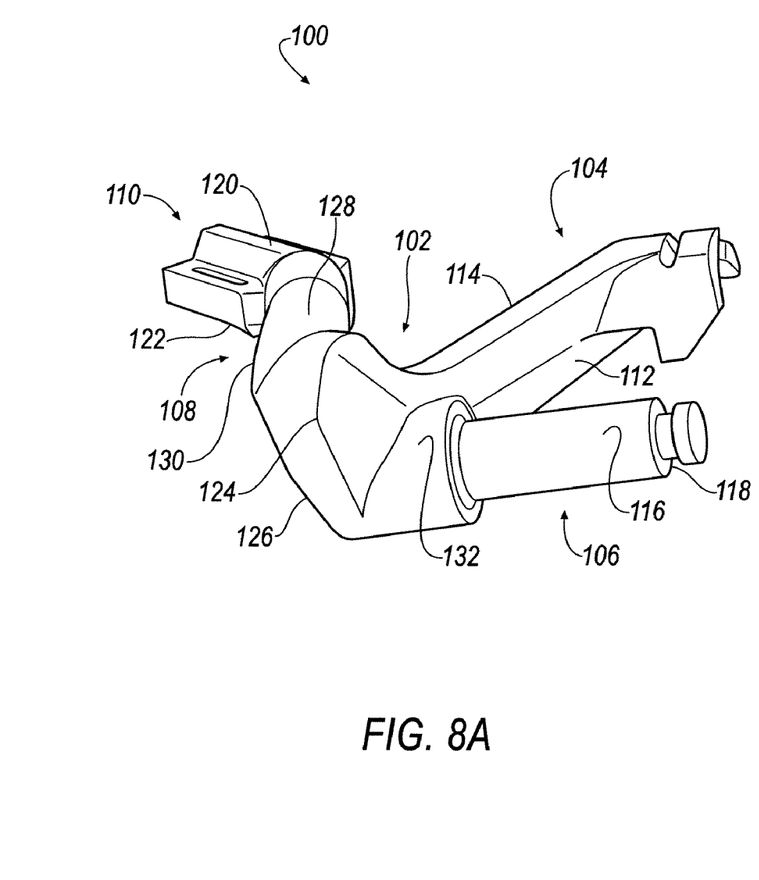
FIG. 8A is a perspective view of a bell crank in accordance with an exemplary embodiment of the invention.
Figure 9A:
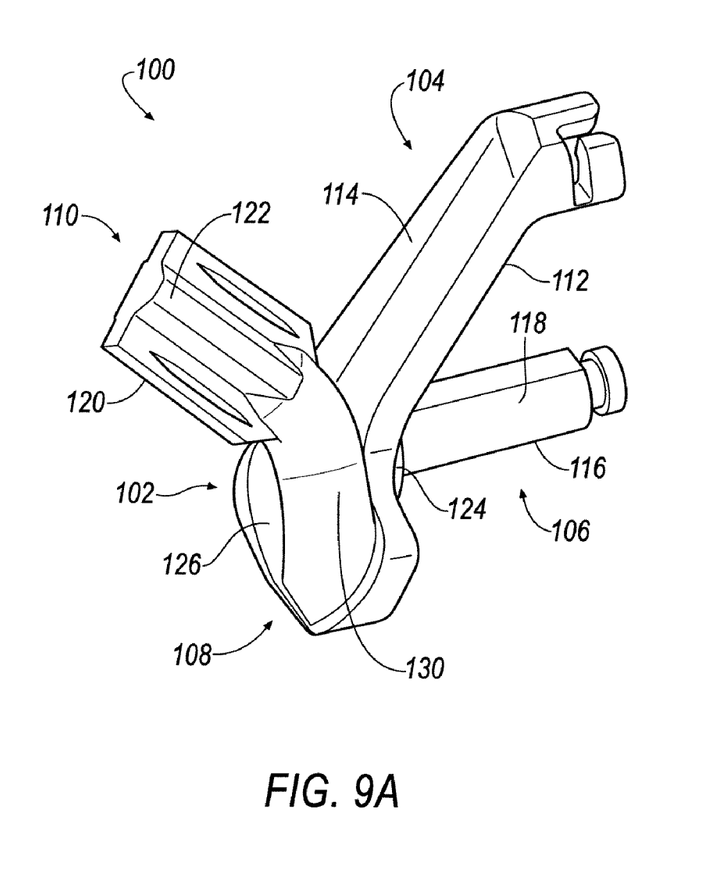
FIG. 9A is another perspective view of the bell crank of FIG. 8A in accordance with an exemplary embodiment of the invention.

Referring now to FIGS. 8A and 9A, a bell crank is shown generally at 100 according to an embodiment. In an embodiment, the material comprising the bell crank 100 includes die-cast zinc.

The function of the bell crank 100 is substantially similar to the bell crank 20 of FIGS. 2 and 5 and is therefore not described in greater detail. Structurally, the bell crank 100 is substantially similar to the bell crank 20. In an embodiment, the bell crank 100 includes a base portion 102, a first arm 104 extending from the base portion 102, a pivot pin 106 extending from the base portion 102, a neck portion 108 extending from the base portion 102 and a second arm 110 extending from the neck portion 108.

A lower surface of the first arm 104 is shown generally at 112 and an upper surface of the first arm 104 is shown generally at 114. A lower surface of the pivot pin 106 is shown generally at 116 and an upper surface of the pivot pin 106 is shown generally at 118. A lower surface of the second arm 110 is shown generally at 120 and an upper surface of the second arm 110 is shown generally at 122.

The base portion 102 also includes a lower surface shown generally as 124 and an upper surface shown generally at 126. Further, the neck portion 108 includes a lower surface 128 and an upper surface 130.

In an embodiment, as seen in FIG. 8A, the lower surface 112 of the first arm 104 extends from the lower surface 124 of the base portion 102. The lower surface 128 of the neck portion 108 extends from the lower surface 124 of the base portion 102. In an embodiment, the lower surface 116 of the pivot pin 106 extends from the lower surface 124 of the base portion 102. In an embodiment, a collar surface portion 132 of the pivot pin 106 is shown extending between the lower surface 116 of the pivot pin 106 and the lower surface 124 of the base portion 102.

In an embodiment, as seen in FIG. 9A, the upper surface 114 of the first arm 104 extends from the upper surface 126 of the base portion 102. The upper surface 130 of the neck portion 108 also extends from the upper surface 126 of the base portion 102. Further, the upper surface 118 of the pivot pin 106 extends from the lower surface 124 of the base portion 102.

Figure 8B:
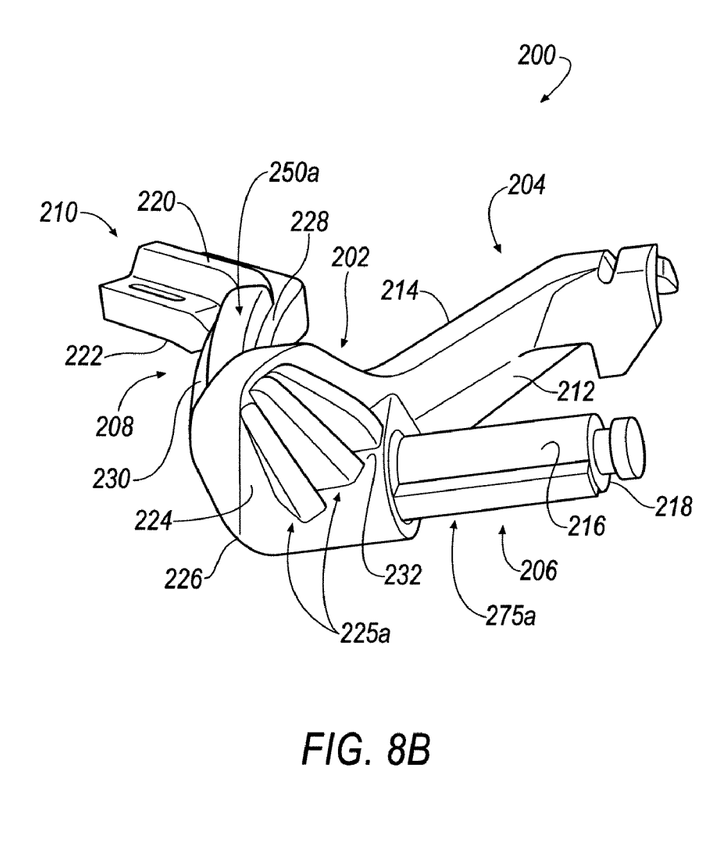
FIG. 8B is a perspective view of a bell crank in accordance with an exemplary embodiment of the invention.
Figure 9B:
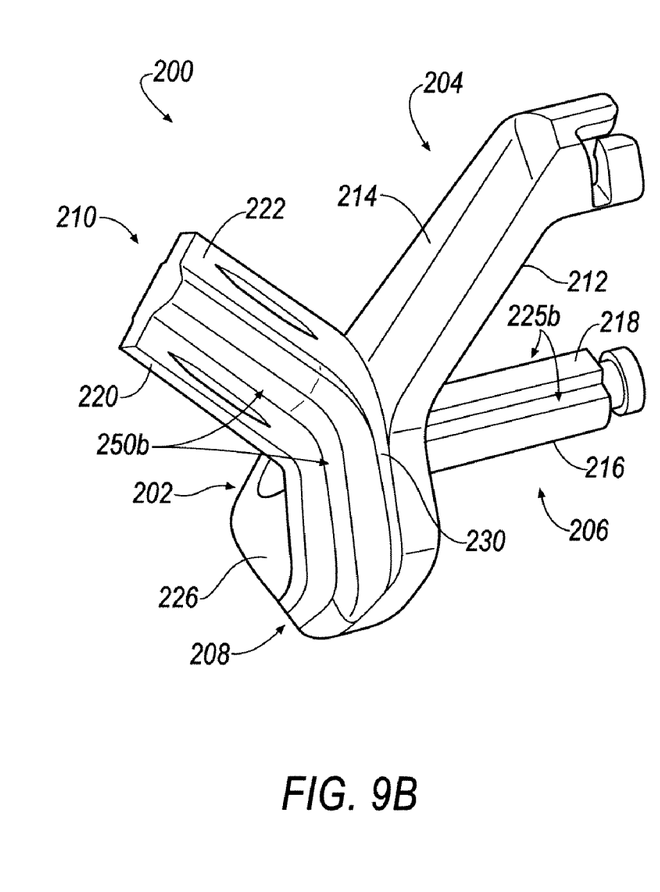
FIG. 9B is another perspective view of the bell crank of FIG. 8B in accordance with an exemplary embodiment of the invention.

Referring now to FIGS. 8B and 9B, a bell crank is shown generally at 200 according to an embodiment. In an embodiment, the material comprising the bell crank 200 includes a composite-reinforced, injection-molded, high-strength, low-weight material. In an embodiment, the material of the bell crank 200 may include, for example, reinforced nylon (e.g., polyarylamide), nylon (e.g., polyamide), polypropylene, or the like.

The function of the bell crank 200 is substantially similar to the bell crank 20 of FIGS. 2 and 5 and is therefore not described in greater detail. Structurally, the bell crank 200 is substantially similar to the bell crank 100 with the exception that the bell crank 200 includes several pluralities of ribs, which are shown generally at 225a, 225b, 250a, 250b and 275a.

Referring to FIG. 8B, the first plurality of ribs is shown generally at 225a, the second plurality of ribs is shown generally at 250a and the third plurality of ribs is shown generally at 275a. In an embodiment, the first plurality of ribs 225a are shown extending from the lower surface 224 of the base portion 202 and the collar surface portion 232. In an embodiment, the second plurality of ribs 250a are shown extending from one or more of the lower surface 220 of the second arm 210 and the lower surface 228 of the neck portion 208. In an embodiment, the third plurality of ribs 275a is shown extending from the lower surface 216 of the pivot pin 206.

Referring to FIG. 9B, a fourth plurality of ribs is shown at 225b and a fifth plurality of ribs is shown at 250b. In an embodiment, the fourth plurality of ribs 225b is shown extending from the upper surface 218 of the pivot pin 206. In an embodiment, the fifth plurality of ribs 250b are shown extending from one or more of the upper surface 222 of the second arm 210 and the upper surface 230 of the neck portion 208.

Because the bell crank 200 is made from a polymeric material rather than a die-cast material, such as, for example, zinc, the bell crank 200 may be generally defined to include a uniform thickness for one or more of the base portion 202, first arm 204, pivot pin 206, neck portion 208 and second arm 210. Accordingly, in an embodiment, one or more of the plurality of ribs 225a, 225b, 250a, 250b, 275a may define a reduced overall volume/thickness of the bell crank 200 in view of the bell crank 100. Further, the bell crank 200 may be formed to include larger radii rather than relatively sharp corners to promote material flow during the injection molding process.

Regarding thickness uniformity, the following structural differences may result when comparing the structure of the bell crank 200 to the bell crank 100. For example, the first plurality of ribs 225a of the bell crank 200 may reduce the overall volume/thickness of the bell crank 100 proximate one or more of the lower surface 124 of the base portion 102 and the collar surface portion 132 of the pivot pin 106. Further, in an embodiment, the second plurality of ribs 250a of the bell crank 200 may reduce the overall volume/thickness of the bell crank 100 proximate one or more of the lower surface 220 of the second arm 210 and the lower surface 228 of the neck portion 208. Even further, in an embodiment, the third and fourth plurality of ribs 225b, 275a of the bell crank 200 may reduce the overall volume/thickness of the bell crank 100 proximate one or more of the lower surface 216 and upper surface 218 of the pivot pin 206. Yet even further, in an embodiment, the fifth plurality of ribs 250b of the bell crank 200 may reduce the overall volume/thickness of the bell crank 100 proximate one or more of the upper surface 222 of the second arm 210 and the upper surface 230 of the neck portion 208.

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

The invention claimed is:

1. A door handle assembly for a door substrate having an aperture, said door handle assembly comprising:
    a bell crank capable of pivoting about an axis, the bell crank including a first arm, a second arm and a base therebetween;
    a door handle that operatively engages the second arm of the bell crank,
    wherein a free end of the second arm extends upward and outward away from the base such that the free end of the second arm sweeps around a generally conical shape as the bell crank pivots about the axis;
    means for securing the door handle to the bell crank including a pin and notch assembly, wherein the pin is inserted through an aperture in the door handle and engages a notch located on the second arm; and
    a plurality of ribs formed on one or more surfaces of the bell crank.

2. A door handle assembly according to claim 1, wherein the first arm includes a free end that rotates about the axis in a first plane, and wherein the free end of the second arm and the free end of the first arm are longitudinally offset a distance sufficient to extend the free end of the second arm through aperture of the door substrate and operatively engage the door handle.

3. A door handle assembly according to claim 1, wherein the first arm further includes a cable assembly, and wherein the cable assembly is actuated when the first arm pivots about the axis.

4. A door handle assembly according to claim 1 further comprising a back plate including a biasing member, and wherein the biasing member exerts a biasing force on the bell crank to maintain the bell crank in a position of rest.

5. A door handle assembly according to claim 1, wherein the bell crank includes a composite-reinforced, molded material.

6. A door handle assembly according to claim 5, wherein the composite-reinforced, molded material includes nylon.

7. A door handle assembly according to claim 1, wherein the bell crank includes a composite-reinforced, molded material.

8. A door handle assembly according to claim 7, wherein the composite-reinforced, molded material includes nylon.

9. A door handle assembly for a door substrate having an aperture, said door handle assembly comprising:
    a bell crank capable of pivoting about an axis, the bell crank including a first arm, a second arm and a base therebetween;
    a door handle that operatively engages the second arm of the bell crank,
    wherein a free end of the second arm extends upward and outward away from the base such that the free end of the second arm sweeps around a generally conical shape as the bell crank pivots about the axis;

a back plate including a biasing member, and wherein the biasing member exerts a biasing force on the bell crank to maintain the bell crank in a position of rest; and a plurality of ribs formed on one or more surfaces of the bell crank.

10. A door handle assembly according to claim 9, wherein the first arm includes a free end that rotates about the axis in a first plane, and wherein the free end of the second arm and the free end of the first arm are longitudinally offset a distance sufficient to extend the free end of the second arm through aperture of the door substrate and operatively engage the door handle.

11. A door handle assembly according to claim 9, wherein the first arm further includes a cable assembly, and wherein the cable assembly is actuated when the first arm pivots about the axis.

12. A door handle assembly according to claim 9, further including means for securing the door handle to the bell crank.

13. A door handle assembly according to claim 12, wherein the means for securing the door handle to the bell crank includes a pin and notch assembly, wherein a pin is inserted through an aperture in the door handle and engages a notch located on the second arm.

14. A door handle assembly according to claim 9, further including means for securing the door handle to the bell crank, wherein said means includes a plurality of extensions on the second arm, and wherein the extensions engage the door handle when the door handle is inserted over the second arm of the bell crank.

15. A door handle assembly according to claim 9, wherein the bell crank includes a composite-reinforced, molded material.

16. A door handle assembly according to claim 15, wherein the composite-reinforced, molded material includes nylon.

* * * * *